US012406799B2

(12) United States Patent
Yan

(10) Patent No.: US 12,406,799 B2
(45) Date of Patent: Sep. 2, 2025

(54) HIGH CURRENT, MULTI-PHASE, SURFACE MOUNT INDUCTOR AND METHODS OF FABRICATION

(71) Applicant: EATON INTELLIGENT POWER LIMITED, Dublin (IE)

(72) Inventor: Yipeng Yan, Pleasanton, CA (US)

(73) Assignee: Eaton Intelligent Power Limited, Dublin (IE)

( * ) Notice: Subject to any disclaimer, the term of this patent is extended or adjusted under 35 U.S.C. 154(b) by 813 days.

(21) Appl. No.: 17/578,724

(22) Filed: Jan. 19, 2022

(65) Prior Publication Data

US 2022/0254563 A1 Aug. 11, 2022

Related U.S. Application Data

(60) Provisional application No. 63/139,192, filed on Jan. 19, 2021.

(51) Int. Cl.
*H01F 27/29* (2006.01)
*H01F 27/06* (2006.01)
*H01F 27/24* (2006.01)
*H01F 41/02* (2006.01)

(52) U.S. Cl.
CPC ........... *H01F 27/292* (2013.01); *H01F 27/06* (2013.01); *H01F 27/24* (2013.01); *H01F 41/0246* (2013.01); *H01F 2027/065* (2013.01)

(58) Field of Classification Search
CPC ........ H01F 27/292; H01F 27/06; H01F 27/24; H01F 41/0246; H01F 2027/065; H01F 3/14; H01F 38/023; H01F 27/2852; H01F 27/306; H01F 336/20; H01F 336/233–234; H01F 336/212; H01F 336/192; H01F 336/83
See application file for complete search history.

(56) References Cited

FOREIGN PATENT DOCUMENTS

| | | |
|---|---|---|
| JP | 2004014671 A * | 1/2004 |
| JP | 2005142459 A * | 6/2005 |

* cited by examiner

*Primary Examiner* — Tuyen T Nguyen
(74) *Attorney, Agent, or Firm* — Baker Botts L.L.P.

(57) ABSTRACT

An integrated multi-phase inductor component assembly includes a single piece core or a multi-piece magnetic core that may be easily assembled with multiple coils arranged in a mirror-image relationship in the magnetic core. The coils include vertically extending, planar main winding sections extending in spaced apart but parallel vertical planes and horizontal sections extending in coplanar relationship on top and bottom sides of the magnetic core for surface mounting to a circuit board or through hole mounting to another circuit board or another component in power supply circuitry for an electronic device.

17 Claims, 6 Drawing Sheets

HIGH CURRENT, MULTI-PHASE, SURFACE MOUNT INDUCTOR AND METHODS OF FABRICATION

CROSS REFERENCE TO RELATED APPLICATIONS

This application claims the benefit of U.S. Provisional Application Ser. No. 63/139,192 filed Jan. 19, 2021, the complete disclosure of which is hereby incorporated by reference in its entirety.

BACKGROUND OF THE INVENTION

The field of the invention relates generally to surface mount electromagnetic component assemblies and methods of manufacturing the same, and more specifically to high current, multi-phase surface mount inductor components and methods of manufacturing the same.

Electromagnetic components such as inductors are known that utilize electric current and magnetic fields to provide a desired effect in an electrical circuit. Current flow through a conductor in the inductor component generates a magnetic field that can be concentrated in a magnetic core. The magnetic field, in turn, beneficially stores energy and releases energy, cancels undesirable signal components and noise in power lines and signal lines of electrical and electronic devices, or otherwise filters a signal to provide a desired output.

Increased power density in circuit board applications has resulted in a further demand for integrated multi-phase inductor solutions to provide power supplies in reduced package sizes. Such integrated multi-phase inductor components include a plurality of inductor coils provided on a common magnetic core structure. The coils may be magnetically coupled or non-coupled to realize different electromagnetic effects and performance characteristics. Relative to a number of discrete components each having an individual magnetic core and a single winding, such integrated multi-phase non-coupled and coupled inductor solutions may realize considerable space savings on a circuit board. Conventional integrated multi-phase non-coupled and coupled inductor solutions, however, are undesirably limited in some performance aspects and improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
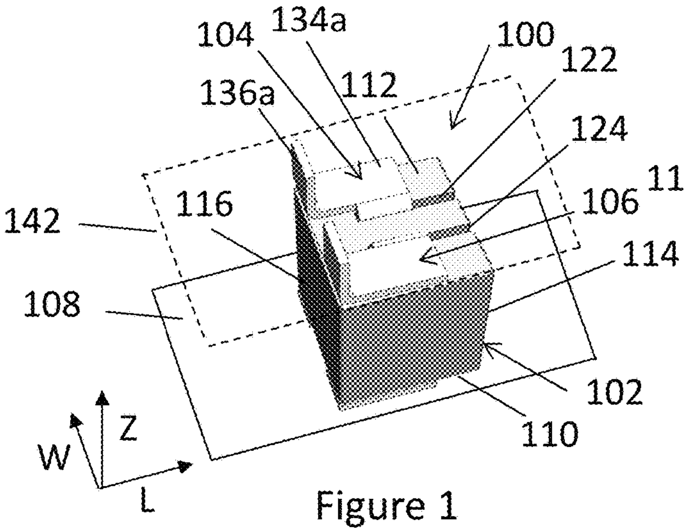
FIG. 1 is a top perspective view of a first exemplary embodiment of an integrated multi-phase inductor component assembly.
Figure 2:
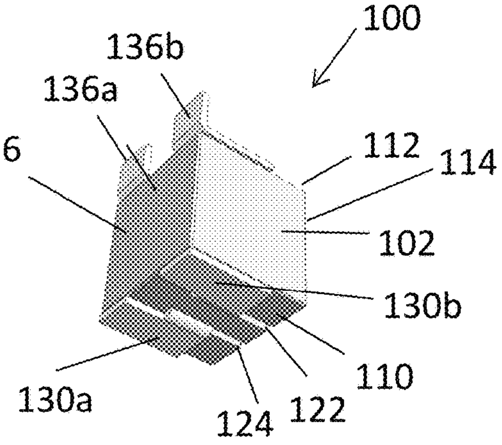
FIG. 2 is a bottom perspective view of the component assembly shown in FIG. 1.
Figure 3:
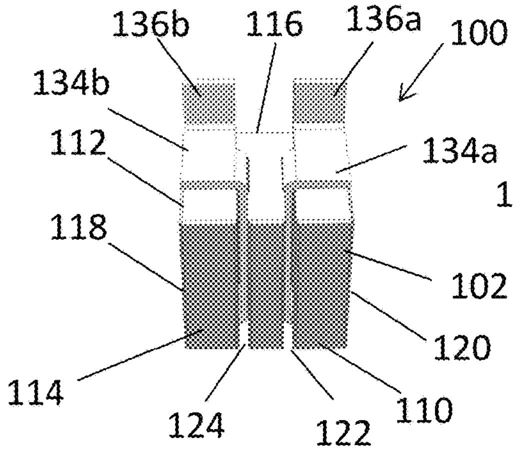
FIG. 3 is a front perspective view of the component assembly shown in FIGS. 1 and 2.

State of the art telecommunications and computing (datacenter, cloud, etc.) applications are requiring ever more powerful and high performance power supplies. In the case of medium and low power supplies (below 40 amps), a single-phase power supply architecture is adequate. However, with the latest processors, field programmable gate arrays (FPGAs), application specific integrated circuits (ASICs), and cloud computing systems, higher levels of power and greater performance are in demand. New power supply modules for high current computing applications such as servers and the like are therefore needed.

In order to achieve new and higher thresholds of power delivery, multiphase power supply architectures are desired. Multiphase power supplies can be designed to be much more efficient than single-phase supplies at higher power levels, and the architecture also allows for more operational flexibility. Such flexibility could also include turning off some of the phases when they aren't needed to deliver the required power, and redundancy if failures occur in certain portions of the power supply system. Multiphase power supplies, however, require much more complex design strategies. Importantly, the increased complexity falls largely on the magnetic components of the power supplies. Innovative integrated inductor design, for both non-coupled and coupled inductors, is needed to address these challenges and enable a new standard in high performance power supplies for modern use cases.

For surface mount inductor component manufacturers, the challenge has been to provide increasingly miniaturized inductor components so as to minimize the area occupied on a circuit board by the inductor component (sometimes referred to as the component "footprint") and also its height measured in a direction perpendicular to a plane of the circuit board (sometimes referred to as the component "profile"). By decreasing the footprint and profile of inductor components, the size of the circuit board assemblies for electronic devices can be reduced and/or the component density on the circuit board(s) can be increased, which allows for reductions in size of the electronic device itself or increased capabilities of a device with a comparable size. Miniaturizing electronic components in a cost effective manner has, however, introduced a number of practical challenges to electronic component manufacturers in a highly competitive marketplace. Because of the high volume of inductor components needed for electronic devices in great demand, cost reduction in fabricating inductor components, without sacrificing performance, has been of great practical interest to electronic component manufacturers.

In general, each generation of electronic devices needs to be not only smaller, but offer increased functional features and capabilities. As a result, the electronic devices must be increasingly powerful devices. For some types of components, such as electromagnetic inductor components that, among other things, may provide energy storage and regulation capabilities, meeting increased power demands while continuing to reduce the size of inductor components that are already quite small, has proven challenging as a general proposition, and especially challenging for certain applications.

Multiple phase paralleled buck converters are widely utilized in power supply applications to manage higher current applications and provide enhanced capabilities and functions. A multiphase buck converter can more efficiently handle higher power than a single-phase buck converter of equivalent power output specification, imposing new demands for integrated multi-phase non-coupled and coupled inductors for power supply converter applications in telecommunications and computing applications due to their space saving advantages on a circuit board.

In some cases, the integrated multi-phase inductor components desirably operate with low inductance and high inductance for fast load transient response, high DC bias current resistance, and high efficiency individually. With continuous inductor size reduction, it is more and more challenging to achieve both high initial inductance and high DC bias current resistance together with conventional single step inductance drop characteristics.

Swing-type inductor components are known that are self-adjustable to achieve optimal trade-off between transient performance, DC bias current resistance and efficiency in power converter applications. Unlike other types of inductor components wherein the inductance of the component is generally fixed or constant despite the current load, swing-type inductor operate with an inductance that varies with the current load. Specifically, the swing-type inductor component may include a core that can be operated almost at magnetic saturation under certain current loads. The inductance of a swing core is at its maximum for a range of relatively small currents, and the inductance changes or swings to a lower value for another range of relatively higher currents. Swing-type inductors and their multiple step inductance rolloff characteristics can avoid the limitations of other types of inductor components in power converter applications, but are difficult to economically manufacture in desired footprints while still delivering desired performance. Improvements are accordingly desired.

Exemplary embodiments of integrated multi-phase inductor components are described hereinbelow that may more capably perform in higher current, higher power circuitry than conventional integrated multi-phase inductor components now in use. The exemplary embodiments of integrated multi-phase inductor component assemblies are further manufacturable at relatively low cost and with simplified fabrication processes and techniques. Further miniaturization of the exemplary embodiments of integrated multi-phase inductors is also facilitated to provide surface mount inductor components with smaller package size, yet improved capabilities in high current applications. Swing-type and non-swing type inductor components may be realized in an economical manner in desired package sizes with desired performance capabilities. Method aspects will be in part apparent and in part explicitly discussed in the description below.

FIGS. 1-4 illustrate various views of a first exemplary embodiment of an integrated multi-phase inductor component assembly 100. The component 100 includes a magnetic core structure in the form of a single piece magnetic core 102 and a pair of conductive coils 104, 106 (FIGS. 4 and 5) assembled thereto which may, in turn, be surface mounted to a circuit board 108 (FIG. 1). The circuit board 108 and the integrated multi-phase inductor component assembly 100 define a portion of power supply circuitry included in an electronic device. In a contemplated embodiment, the power supply circuitry on the circuit board 108 may implement a multiphase power supply architecture including a multiphase buck converter connected to the coils 104, 106 of the integrated multi-phase inductor component assembly 100 in a high current computing application. As such multiphase power supply architecture and multiphase buck converter are known and within the purview of those in the art, further description thereof is omitted herein. The specific applications herein are, however, provided for the sake of illustration rather than limitation, and other applications are possible.

The single piece magnetic core 102 is formed with a bottom side 110 that abuts the circuit board 108 in use, a top side 112 opposite the bottom side 110, opposing front and rear sides 114 and 116 interconnecting the top and bottom sides 110 and 112, and left and right sides 118 and 120 interconnecting the top, bottom, front and rear sides 110, 112, 114 and 116. The sides 110, 112, 114, 116, 118 and 120 in the core piece 102 in the example shown are generally orthogonally oriented to one another to form a box-like shape as shown. The sides 110, 112, 114, 116, 118 and 120 have generally flat and planar outer surfaces, making the core piece 102 relatively easy to fabricate. For the purposes of the present description, the term "single" shall mean "only one" or "not one of several". Thus, the single piece magnetic core 102 is distinguished from an assembly of a plurality of magnetic core pieces around the coils. The entire magnetic core structure is defined by the single piece core 102, as opposed to a magnetic core structure otherwise defined by a combination of magnetic core pieces.

The magnetic core piece 102 has an overall length L along a first dimension extending parallel to the plane of the circuit board 108 (e.g., an x axis of a Cartesian coordinate system), a width W measured along a second dimension perpendicular to the first axis but still parallel to the plane of the circuit board 108 (e.g., a y axis of a Cartesian coordinate system), and a height H measured along a third dimension perpendicular to the first and second axis and the plane of the circuit board 108 (e.g., a z axis of a Cartesian coordinate system). In the illustrated examples, the width dimension may extend between the left and right sides 118, 120; the length dimension may extend between the front and rear sides 114, 116; and the height dimension may extend between the top and bottom sides 112, 114. As seen in the Figures, the length dimension, width dimension, and height dimension are nearly equal and the footprint of the component on the plane of the circuit board 108 is minimized, although other relative proportions of length, width and height of the magnetic core piece 102 are possible in other embodiments.

The front side 114 of the magnetic core piece 102 is further formed with coil slots 122 and 124 that respectively receive a portion of the coils 104, 106. The coil slots 122, 124 extend generally straight and parallel to one another in a spaced apart relationship, extend completely from the bottom wall 110 to the top wall 112, and extend only partly between the front side 114 and the rear wall 116. The component assembly 100 including two coil slots 122, 124 and two coils 104, 106 in the common magnetic core piece 102 is well suited for a two-phase power system. The component assembly 100 is scalable however, to include additional numbers of coil slots and coils to easily adapt the component for further phases of multi-phase power applications or to obtain further space efficiencies by incorporating multiple coil windings on a common core structure. While specific geometry and location of the coil slots are shown and described, variations are of course possible with similar effect. For applications other than the aforementioned high power computing applications wherein single phase power supply architecture is acceptable, the component 100 could be provided with one coil slot and only one coil and therefore be a single-phase inductor component while still achieving at least some of the benefits described herein.

In contemplated embodiments, the magnetic core piece 102 may be fabricated utilizing soft magnetic particle materials and known techniques such as molding of granular magnetic particles to produce the desired shapes. Soft magnetic powder particles used to fabricate the magnetic core pieces may include Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, and other suitable materials known in the art. In some cases, magnetic powder particles may be are coated with an insulating material such the magnetic core pieces may possess so-called distributed gap properties familiar to those in the art and fabricated in a known manner. The magnetic core pieces may be fabricated from the same or different magnetic materials and as such may have the same or different magnetic properties as desired. The magnetic powder particles used to fabricate the magnetic core pieces may be obtained using known methods and techniques and molded into the desired shapes also using known techniques.

Figure 5:
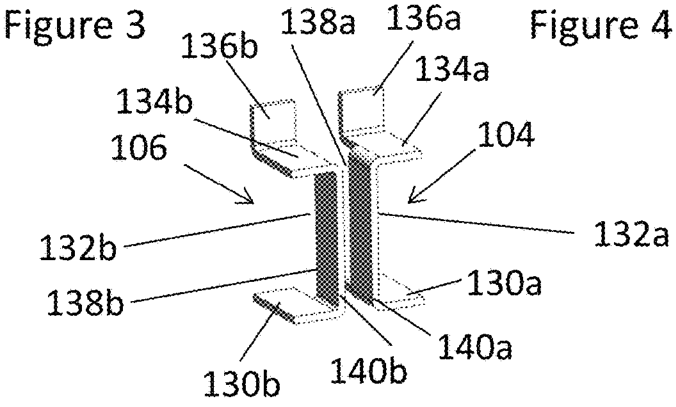
FIG. 5 is front perspective view of exemplary coils for the component assembly shown in FIGS. 1-4.
Figure 6:
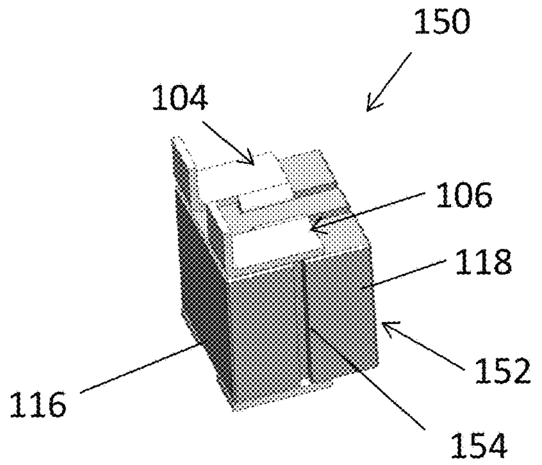
FIG. 6 is a top perspective view of a second exemplary embodiment of an integrated multi-phase inductor component assembly.
Figure 7:
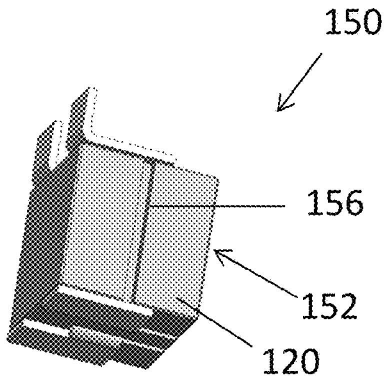
FIG. 7 is a bottom perspective view of the component assembly shown in FIG. 6.
Figure 8:
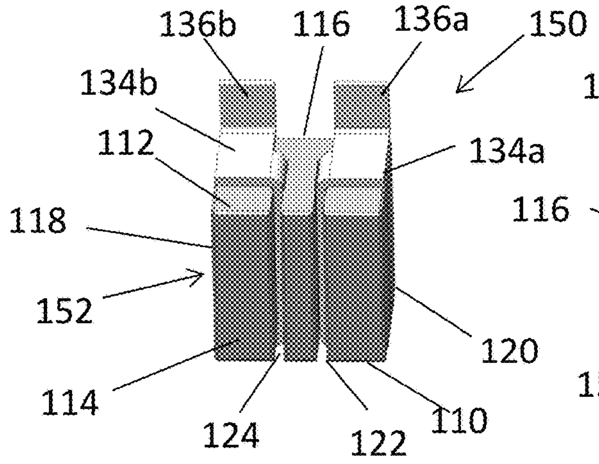
FIG. 8 is a front perspective view of the component assembly shown in FIGS. 6 and 7.
Figure 9:
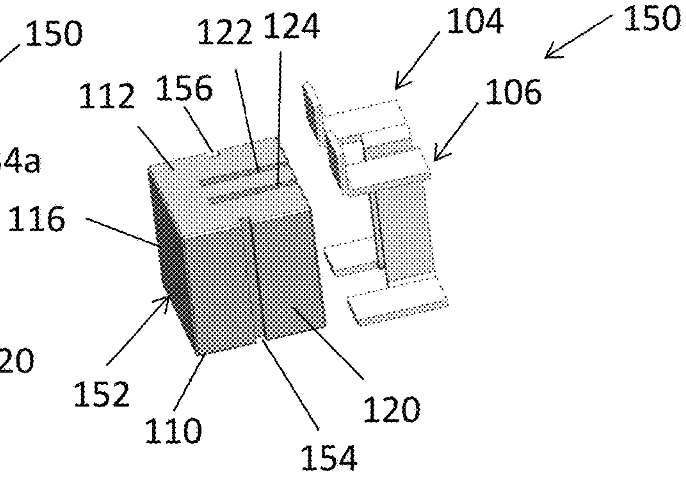
FIG. 9 is an exploded view of the component assembly shown in FIGS. 6, 7 and 8.
Figure 10:
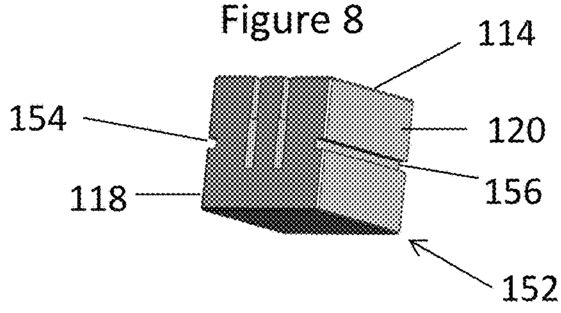
FIG. 10 is a perspective view of the magnetic core piece for the component assembly shown in FIGS. 6 through 9.
Figure 11:
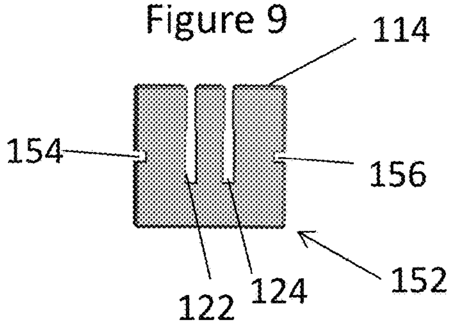
FIG. 11 is an end view of the magnetic core piece shown in FIG. 10.

The coils 104, 106 are substantially identically formed and shaped conductive elements that are arranged in an opposing, mirror image relationship to one another when assembled to the core piece 102. Each coil 104, 106 respectively includes, as best seen in FIG. 5: a first horizontally extending and generally planar surface mount terminal section 130*a* and 130*b*; a generally vertically extending and generally elongated, planar main winding section 132*a*, 132*b* extending perpendicularly to the respective surface mount terminal section 130*a*, 130*b*; a second horizontally extending and generally planar terminal section 134*a* and 134*b* extending from the planar main winding section 132*a*, 132*b* opposite the surface mount terminal section 130*a* and 130*b*; and terminal tabs 136*a*, 136*b* extending perpendicularly from the planar terminal section 134*a* and 134*b* in a direction upwardly and away from the sections 134*a* and 134*b*. The coils 104, 106 each respectfully define less than one complete turn of an inductor winding in the magnetic core piece 102, yet each of them has a sufficient thickness and cross sectional area to capably conduct higher current to meet performance requirements in higher power circuity implemented on the circuit board 108.

Figure 4:
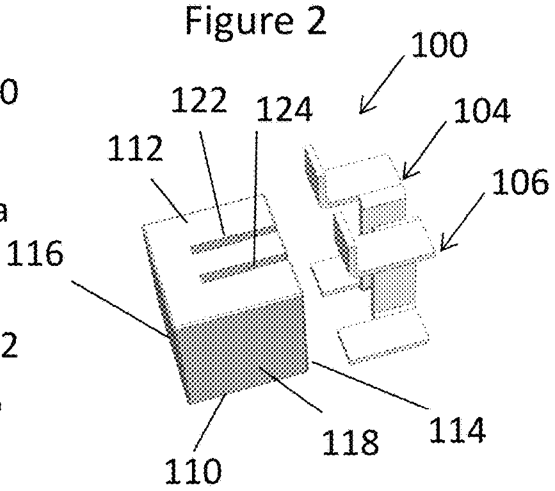
FIG. 4 is an exploded view of the of the component assembly shown in FIGS. 1, 2 and 3.

The coils 104, 106 may be fabricated from a sheet of conductive material having a uniform thickness that is cut and formed or bent in the particular shape having the particular features shown. In contemplated embodiments the coils 104, 106 may be preformed components in the assembly. That is, the formation of the coils 104, 106 may be fully completed in advance and provided in the shape shown and described for assembly with the magnetic core piece 102 at a separate stage of manufacture. In the example shown, the horizontal sections 130*a* and 130*b* and 134*a* and 134*b* are seen in FIGS. 4 and 5 to have a different width than the vertical main winding section 132*a* or 132*b* such that a portion of the horizontal sections 130*a*, 130*b* and 134*a*, 134*b* protrudes beyond one of the side edges 138*a*, 138*b* of the main winding section 132*a*, 132*b* on one side thereof, while being generally flush with the other side edge 140*a*, 140*b* of the main winding section 132*a*, 132*b* in the other side. The larger width of the horizontal sections 130*a*, 130*b* and 134*a*, 134*b* relative to the main winding section 132*a*, 132*b* in each coil 104, 106 imparts an asymmetry to the coils 104, 106 along the vertical axis of the main winding section 132*a*, 132*b*. The presence of the terminal tabs 136*a*, 136*b* on the top side of the coils 104, 106 but not on the bottom side of the coils 104, 106 further imparts an asymmetry to the coils about a horizontal axis.

When assembled to the magnetic core piece 102, the planar main winding sections 132*a*, 132*b* are received in the respective coil slots 122, 124 of the magnetic core piece 102. The coil slots 122, 124 are slightly larger than the thickness of the coils 104, 106 in the main winding section 132*a*, 132*b* to facilitate a slidable insertion of the main winding sections 132*a*, 132*b*. When the main winding sections 132*a*, 132*b* are fully seated in the coil slots 122, 124 the surface mount terminal sections 130*a*, 130*b* underlie the bottom side 110 of the magnetic core piece 102 while the terminal sections 134*a* and 134*b* overly the top side 112 of the magnetic core piece, and while the terminal tabs 136*a*, 136*b* are located adjacent the rear side 112. The main winding sections 132*a*, 132 extend in spaced apart but parallel planes and are relatively close together in the magnetic core piece 102, while the horizontal sections 130*a*, 130*b* and 134*a*, 134*b* extend outwardly from the main sections 132*a*, 132*b* in a coplanar relationship on each of the bottom and top sides 110, 112 of the magnetic core piece 102. The horizontal sections 130, 130*b* and 134*a*, 134*b* respectively extend away from the respective coil slots 122, 124 in a direction alongside and generally flush with the side walls 118, 120 of the magnetic core piece. None of the horizontal sections 130*a*, 130*b*, 134*a* and 134*b* are in contact with or overlie the rear side 116 of the magnetic core piece 102, however. In different embodiments the coils 104, 106 may be magnetically coupled to one another inside the core piece 102, or may be non-magnetically coupled by varying the spacing of the main winding sections 132*a*, 132*b* from one another. For the power converter application, the coils 104, 106 are preferably non-magnetically coupled.

In another embodiment, the coils 104, 106 need not be fully preformed as described above, but instead can be formed and bent into final shape after the main winding sections 132*a*, 134 are inserted through the core piece 102 between the top and bottom sides 112, 110 of the core piece 102.

When fully assembled and secured in place on the magnetic core 102, the surface mount terminal sections 130*a*, 130*b* on the bottom side 110 of the magnetic core piece 102 may be surface mounted to circuit traces on the circuit board 108 via known techniques such as soldering, and the terminal tabs 136*a*, 136*b* may be through hole mounted to a second circuit board or to another component (shown phantom as 142 in FIG. 1) via known techniques such as soldering. The second circuit board or component 142 is spaced apart from the circuit board 108, and as such the terminal structure shown on the ends of the coils 104, 106 establish one electrical connection the circuit board 108 and another to the second circuit board or component 142, as opposed to completing two electrical connections on the same circuit board 108. While exemplary surface mount and through-hole terminal geometry is shown and described to provide respective surface mount and through-hole mount structure on opposing sides of the magnetic core piece 102, variations are of course possible. Also, while different types of mounting structure (i.e., surface mount and through-hole mount features) are shown and described on the opposing ends of the coils 104, 106 in another embodiment the terminal mounting structure could be the same instead of different on each opposing end of the coils 104, 106. That is, and for example only, the coils 104, 106 may alternatively be provided with through-hole terminal structure on both ends or with surface mount terminals on both ends. While one type of surface mount terminal and one type of through-hole terminal structure is shown and described, variations are, of course possible.

The single piece magnetic core piece 102 and the coils 104, 106 may be separately fabricated in batch processing, and provided as preformed and prefabricated modular elements for assembly into components 100 in a reduced amount of time and at lower cost with respect to certain conventional integrated multi-phase inductor components including additional core pieces and/or coils that are more difficult to apply to the magnetic core.

FIG. 6-11 illustrate various views of a second exemplary embodiment of an integrated multi-phase inductor component assembly 150 that may likewise be surface mounted to the circuit board 108 (FIG. 1) on the bottom side as well as establish through-hole connection to the second circuit board or component 142 on the top side. The component 150 includes a single piece magnetic core 152 and coils 104, 106. The single piece magnetic core piece 152 is similar to the single piece magnetic core 102 described above and as such similar manufacturing benefits are realized, but the single magnetic core piece 152 further includes physical gaps 154, 156 respectively formed on an exterior of the sides 118, 120 to realize further performance characteristics that are advantageous. In the example shown, the gaps 154, 156 extend generally vertically in a straight or linear direction from the bottom side 110 to the top side 112 of the core piece 152 and are centered on the respective side walls 118, 120 in the length dimension (i.e., along a direction perpendicular to front and rear sides 110, 112). As such, the gaps 154, 156 generally oppose one another on the sides 118, 120 of the magnetic core 152. The gaps 154, 156 are relatively simply shaped but provide an important performance characteristic for certain applications, namely swing-type inductor functionality as a result of the reduced cross-sectional area of the core including the gaps 154, 156 relative to the component 100 without the gaps 154, 156. While specific geometry and location of the gaps 154, 156 are shown and described, variations are possible with similar effect to produce different degrees of swing-type functionality.

Figure 26:
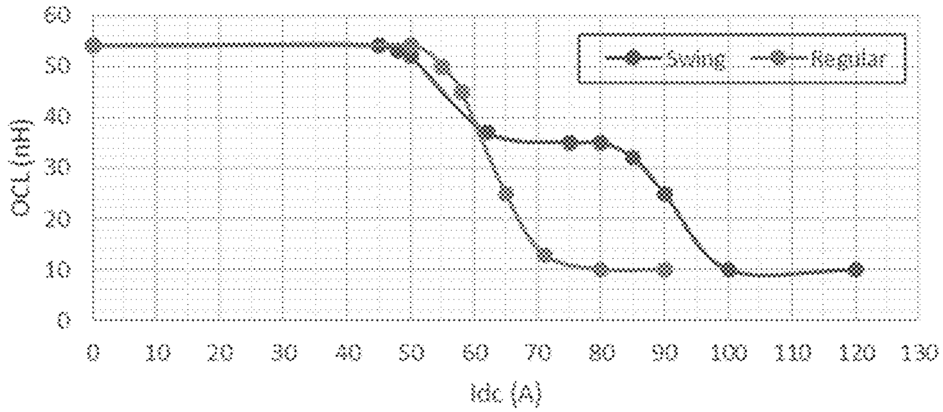
FIG. 26 illustrates relative inductance characteristics of integrated multi-phase inductor component assembly according to embodiments of the present invention.

FIG. 26 illustrates exemplary inductance characteristics of the integrated multi-phase inductor component assemblies 100 and 150 relative to one another. The inductance characteristics are shown in the form of inductance plots wherein inductance values correspond to the vertical axis and wherein current values correspond to the horizontal axis. The inductance plot for the component 100 is shown as “regular” while the inductance plot for the component 150 is shown as “swing” in FIG. 26.

As seen in the inductance plots of FIG. 26, the inductor component assembly 100 of the “regular” component 100 exhibits a fixed and generally constant inductance value indicated by the horizontal line at the left-hand side of FIG. 26 that represents a constant open circuit inductance (OCL) value over a normal operating range of current values. That is, the open circuit inductance (OCL) value of the component 100 is the same regardless of the actual current load in use within the normal operating range of the inductor component assembly 100. The “swing” component 150 exhibits the same OCL value over about the same current range as the component 100.

As also seen in FIG. 26, and represented by the sloped portion of the plot for the “regular” component 100, when the inductor component assembly 100 is operated at a current up to its saturation current ($I_{sat}$) that represents a full load inductance (FLL) or full load operation, the inductor component assembly 100 exhibits a fixed and generally constant inductance value corresponding to a full load inductance (FLL) value regardless of the actual current load. In contrast, and as can be seen in the other plot in FIG. 26 for the “swing” component 150, the swing component has an inductance that varies with the current load, and specifically can be operated almost at magnetic saturation under certain current loads, while changing or swinging to a lower inductance value for another range of relatively higher currents. As such, the “swing” inductor 150 exhibits multiple steps of inductance rolloff characteristics while the “regular” conductor does not (i.e., the “regular” conductor has a single step rolloff characteristic). The multiple step rolloff characteristics of the swing inductor 150 provide substantial performance benefits for certain power converter applications relative to the regular inductor 100 (i.e., a non-swing-type inductor). Specifically, the swing inductor may operate with high inductance at a range of light (i.e., lower) current loads until eventually becoming saturated via a smaller cross sectional of the core (via the additional gaps such as the gaps 154 and 156 described above) until the OCL drops and realizes a higher DC bias resistance for a range of heavy (i.e. higher) current loads, while returning back to the high inductance when the current load returns back to the range of light current load.

Table 1 below shows exemplary length, width and height dimensions and expected performance parameters of components 100 and 150, again with the component 100 indicated as “regular” and with the component 150 indicated as “swing” in the inductor type column. The tabulated performance parameters are well suited for a power converter application but are difficult to achieve in conventional inductor component constructions in similar package sizes.

TABLE 1

| No. | L (mm) | W (mm) | H (mm) | OCL +/− 10% (nH) | Isat 1 @100 C. (A) | Isat2 @100 C. (A) | FLL 1 @Isat1 Typ. (nH) | FLL2 @Isat2 Min. (nH) | DCR @20 C. (mOhm) | Irms For 40 C. ΔT (A) | Inductor Type |
|---|---|---|---|---|---|---|---|---|---|---|---|
| 1 | 6.7 | 6.7 | 5.15 | 54 | 50 | 90 | 35 | 25 | 0.145 | 43 | Swing |
| 2 | 6.7 | 6.7 | 6.15 | 67 | 50 | 90 | 43 | 31 | 0.173 | 40 | Swing |
| 3 | 6.7 | 6.7 | 7.15 | 79 | 50 | 90 | 51 | 37 | 0.201 | 37 | Swing |
| 4 | 6.7 | 6.7 | 8.15 | 91 | 50 | 90 | 59 | 43 | 0.230 | 35 | Swing |
| 5 | 6.7 | 6.7 | 5.15 | 54 | 58 | 90 | 39 | 10 | 0.145 | 43 | Regular |
| 6 | 6.7 | 6.7 | 6.15 | 67 | 58 | 90 | 48 | 10 | 0.173 | 40 | Regular |
| 7 | 6.7 | 6.7 | 7.15 | 79 | 58 | 90 | 57 | 10 | 0.201 | 37 | Regular |
| 8 | 6.7 | 6.7 | 8.15 | 91 | 58 | 90 | 66 | 10 | 0.230 | 35 | Regular |

It is noted that in some embodiments, the gaps 154, 156 can be utilized, or not utilized, on a per-phase basis in the integrated multi-phase inductor component. That is, one phase may be operated with “regular” inductance while another phase may be operated with “swing” inductance when the component is mounted to the circuit board 108.

Figure 12:
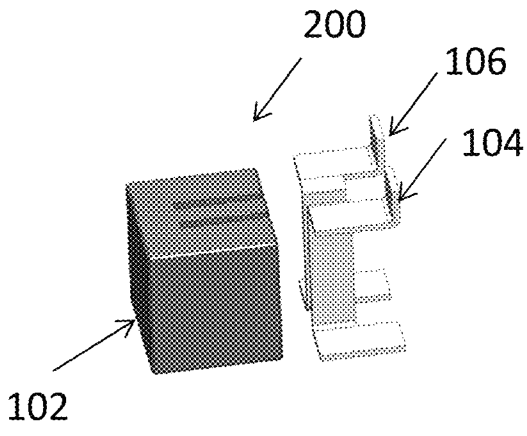
FIG. 12 is an exploded view of a third exemplary embodiment of an integrated multi-phase inductor component assembly.
Figure 13:
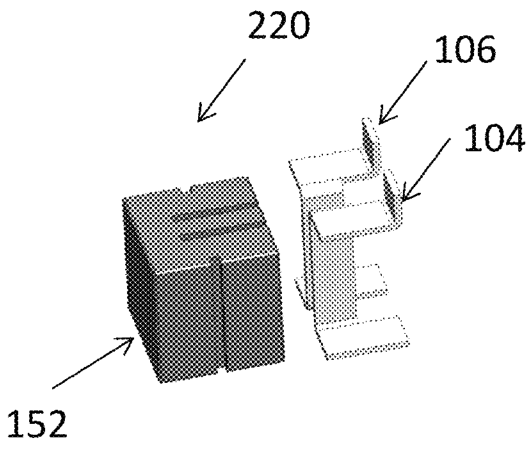
FIG. 13 is an exploded view of a fourth exemplary embodiment of an integrated multi-phase inductor component assembly.

FIGS. 12 and 13 are exploded views of further embodiments of integrated multi-phase inductor component assemblies 200 and 220 that may likewise be surface mounted to the circuit board 108 (FIG. 1) on the bottom side as well as establish through-hole connection to the second circuit board or component 142 on the top side. The inductor component assemblies 200 and 220 are respectively similar to the components 100 and 150 described above and realize similar performance and manufacturing benefits. Comparing FIG. 12 to FIG. 4 and comparing FIG. 13 to FIG. 9 it is seen that the coils 104 and 106 are oriented differently in the components 200 and 220 relative to the components 100 and 150. Specifically, the combination of coils 104 and 106 are assembled to the core piece 102 or 152 after being oriented in a 180° orientation from that shown in FIGS. 4 and 9. As a result the horizontal sections 130*a*, 130*b*, 134*a*, 134*b* of the coils 104, 106 extend in opposite directions in the completed components 200 and 220 (i.e., toward the front side 114 instead of the rear wall 116) on the bottom and top sides of the magnetic core piece 102 in the component assembly 200 or in the component assembly 220.

Figure 14:
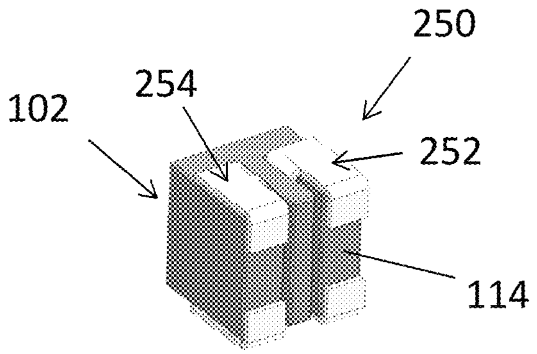
FIG. 14 is a front perspective view of a fifth exemplary embodiment of an integrated multi-phase inductor component assembly.
Figure 15:
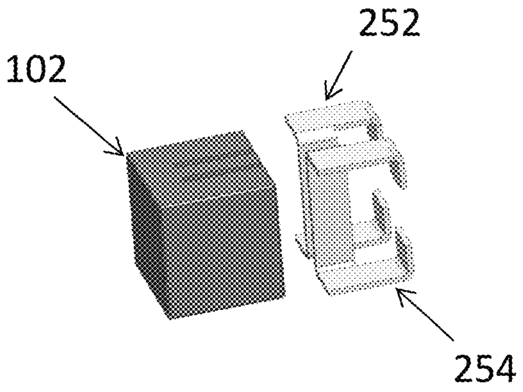
FIG. 15 is an exploded view of the component assembly shown in FIG. 14.
Figure 16:
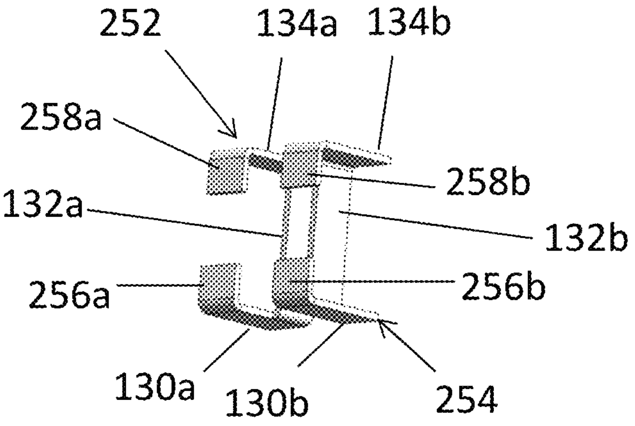
FIG. 16 is a perspective of conductive coils for the component assembly shown in FIGS. 14 and 15.

FIGS. 14-16 are various views an embodiment of an integrated multi-phase inductor component assembly 250 that may likewise be surface mounted to the circuit board 108 (FIG. 1) on the bottom side as well as establish surface mount connection to the second circuit board or component 142 on the top side as described below. The inductor component assembly 200 provides some of the same benefits of the components described above but with a different structure of the coils. The component assembly 250 includes the core piece 102 and coils 252, 254 that each respectively include horizontal sections 130, 130*b*, 134*a*, 134*b* and the vertical main winding sections 132*a*, 132*b*. The distal ends of the horizontal sections 130, 130*b*, 134*a*, 134*b* further include terminal sections 256*a*, 256*b* and 258*a*, 258*b* that extend perpendicularly to the horizontal sections 130*a*, 130*b*, 134*a*, 134*b* and in a direction toward one another. That is, the sections 256*a*, 256*b* and 258*a*, 258*b* extend vertically at a distance from the main winding sections 132*a*, 132*b*. The sections 256*a*, 256*b*, 258*a*, 258*b* extend generally coplanar to one another but in a plane extending perpendicular to the plane of either the main winding section 132*a* or the main section 132*b*.

When the main winding sections 132*a*, 132*a* are assembled to the core piece 102 as described above, the sections 256*a*, 256*b* and 258*a*, 258*b* wrap around and overlie the front side 114 of the magnetic core piece. As such, the component 250 may be surface mounted to the circuit board 108 via the sections 256*a*, 256*b* and 258*a*, 258*b* on the front side 114 of the core piece, or the component 250 may be surface mounted to the circuit board 108 via the sections 130*a*, 130*b*, 134*a*, 134*b* on the top and bottom side 112 and 110. The manufacturing benefits are otherwise similar to the previous embodiments.

Figure 17:
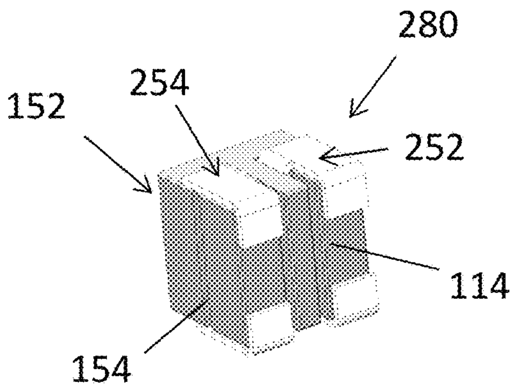
FIG. 17 is a perspective view of a sixth exemplary embodiment of an integrated multi-phase inductor component assembly.
Figure 18:
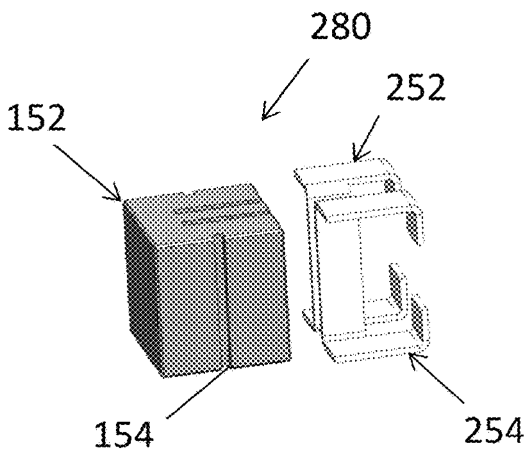
FIG. 18 is an exploded view of the component assembly shown in FIG. 17.

FIGS. 17 and 18 are different views of an embodiment of an integrated multi-phase inductor component assembly 280 that may likewise be surface mounted to the circuit board 108 (FIG. 1) on the bottom side as well as establish surface mount connection to the second circuit board or component 142 on the top side. The component assembly 280 is similar to the component 250 but includes the core piece 152 instead of the core piece 102. By virtue of the core piece 152, swing-type functionality and performance is realized, while the manufacturing and assembly advantages of the components 280 and 250 are similar.

Figure 19:
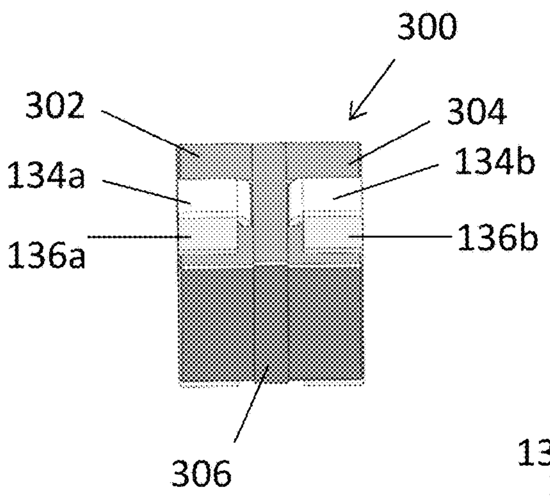
FIG. 19 is a perspective view of a seventh exemplary embodiment of an integrated multi-phase inductor component assembly.
Figure 20:
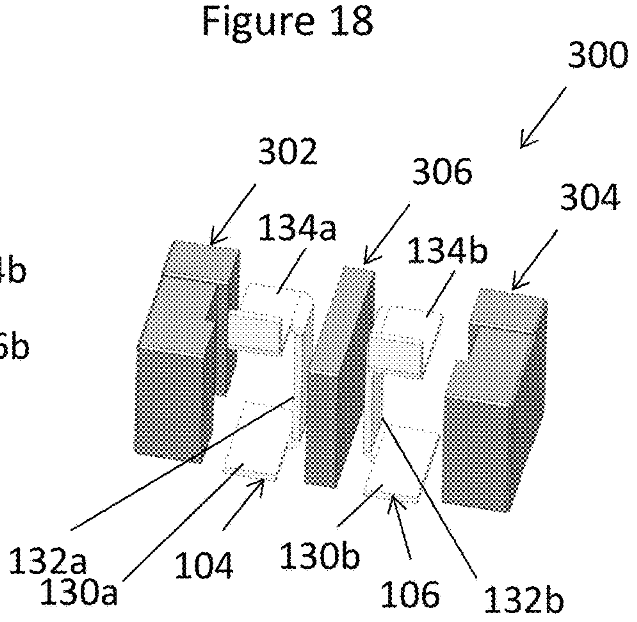
FIG. 20 is an exploded view of the component assembly shown in FIG. 19.

FIGS. 19 and 20 are different views of another embodiment of an integrated multi-phase inductor component assembly 300 that may likewise be surface mounted to the circuit board 108 (FIG. 1) on the bottom side as well as establish surface mount connection to the second circuit board or component 142 on the top side. The inductor component assembly 300 includes a multiple-piece magnetic core construction instead of the single piece magnetic core constructions described above in the previous embodiments. As such, the component assembly 300 includes a first core piece 302 and a second magnetic core piece 304 that opposes the first core piece, with a third magnetic core piece 306 in between. Coils 104, 106 are respectively located between the core piece 302 and the core piece 306 and between the core piece 306 and the core piece 304.

As shown in the illustrated example, interior walls of the core pieces 302 and 304 include vertically extending channels that receive the main winding sections 132*a*, 132*b* of the coils 104, 106 in the assembly 300. The top side of the magnetic core pieces 302 and 304 further includes a recessed surface receiving the horizontal section 134*a* or 134*b* as shown in the Figures. A length of the horizontal section 134*a*, 134*b* in each coil 104, 106 is reduced relative to a length of the horizontal sections 130*a*, 130*b*. As such, the horizontal sections 130*a*, 130*b* extend flush with the end of the magnetic core in the view of FIG. 19, while the horizontal sections 134*a*, 134*b* are spaced from the end edge of the magnetic core, resulting in the terminal tabs 136*a*, 136*b* being flush with the opposing sides of the magnetic core while being spaced from the third side.

The multi-piece core construction of the component assembly 300 lends itself to modular expansion to add core pieces and coils to scale the number of inductors in the resultant integrated multi-phase core components with relative ease from a small set of component parts, whereas the single piece core constructions require an inventory of different core pieces to provide components with different numbers of coils. The multi-piece core construction may also include core pieces having different magnetic materials for still further performance variations to meet the needs of particular applications.

Figure 21:
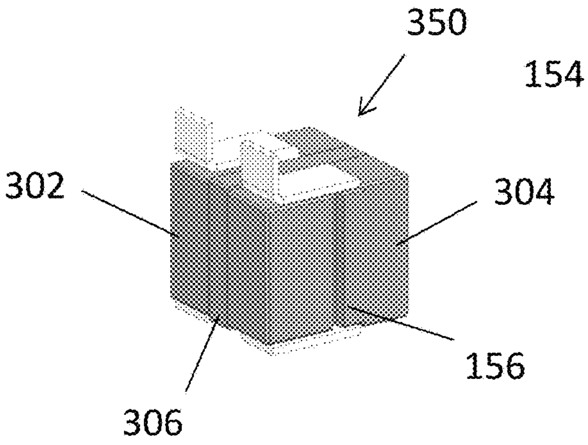
FIG. 21 is a perspective view of an eighth exemplary embodiment of an integrated multi-phase inductor component assembly.
Figure 22:
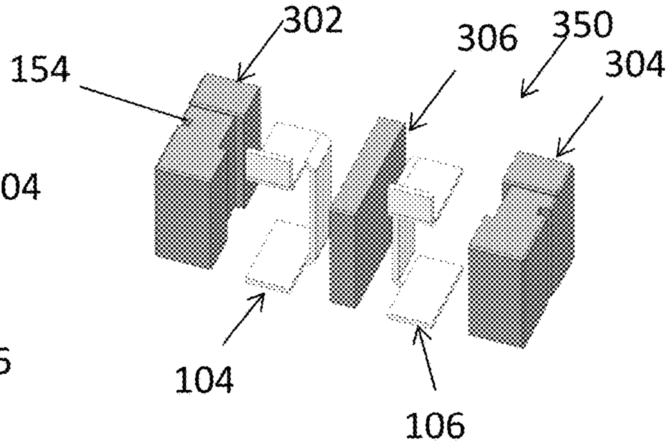
FIG. 22 is an exploded view of the component assembly shown in FIG. 20.

FIGS. 21 and 22 are different views of another embodiment of an integrated multi-phase inductor component assembly 350 that may likewise be surface mounted to the circuit board 108 (FIG. 1) as well as connected to the second circuit board or component 142 on the top side. The component assembly 300 is similar to the component 300, with the addition of physical gaps 154, 156 respectively formed in the magnetic pieces 302, 304 to realize swing-type inductor performance characteristics.

Figure 23:
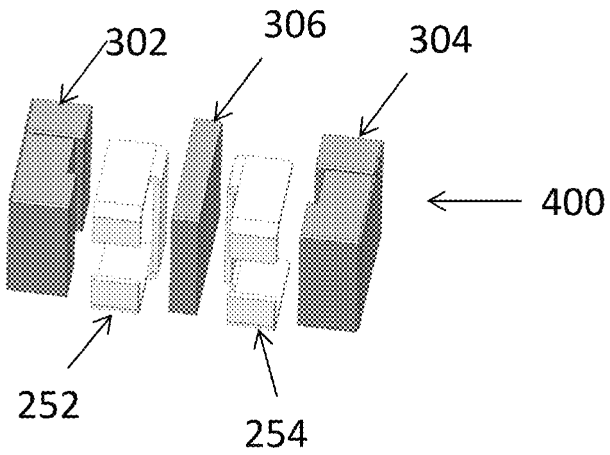
FIG. 23 is an exploded view of an ninth exemplary embodiment of an integrated multi-phase inductor component assembly.

FIG. 23 is an exploded view of another embodiment of an integrated multi-phase inductor component assembly 400 that may likewise be surface mounted to the circuit board 108 (FIG. 1) on the bottom side as well as establish surface mount connection to the second circuit board or component 142 on the top side. The component assembly 400 is similar to the assembly 300 but includes coils 252, 254 instead of the coils 104, 106.

Figure 24:
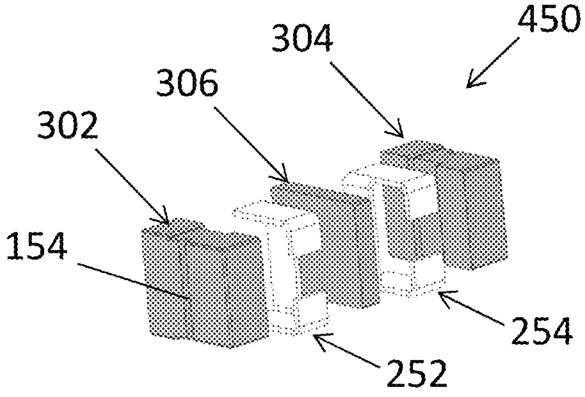
FIG. 24 is an exploded view of a tenth exemplary embodiment of an integrated multi-phase inductor component assembly.

FIG. 24 is an exploded view of another embodiment of an integrated multi-phase inductor component assembly 450 that may likewise be surface mounted to the circuit board 108 (FIG. 1) on the bottom side as well as establish surface mount connection to the second circuit board or component 142 on the top side as described below. The component assembly 450 is similar to the component 400 but includes physical gaps 154, 156 respectively formed in the magnetic pieces 302, 304 to realize swing-type inductor performance characteristics.

Figure 25:
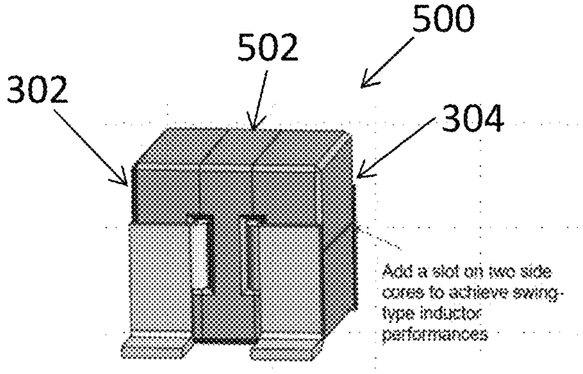
FIG. 25 is a top view of an eleventh exemplary embodiment of an integrated multi-phase inductor component assembly.

FIG. 25 is a top perspective view of another embodiment of an integrated multi-phase inductor component assembly 500 that may likewise be mounted to the circuit board 108 (FIG. 1) on the bottom side as well as connected to the second circuit board or component 142 on the top side. The component assembly 500 includes the core pieces 302 and 304 and coils similar to those described above. A third core piece 502 extends between the coils and the core pieces 302 and 304, which unlike the core piece 306 in the previous embodiments, is formed with coil channels on the opposing sides thereof. As such, the main winding sections 132*a*, 132*b* of the coils in the component assembly 500 are received partly in the coil channels of the core pieces 302, 304 and partly in the coil channels of the third core piece 510. Physical gaps similar to the gaps 154, 156 may optionally be formed in the core pieces 302, 304 to provide desired swing-type inductor performance characteristics.

Figure 27:
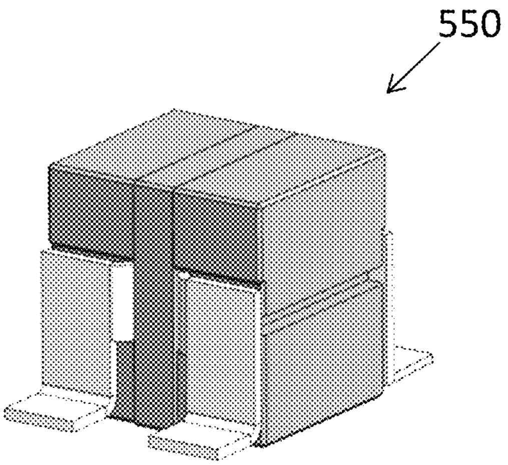
FIG. 27 is a top view of an eleventh embodiment of an integrated multi-phase inductor component assembly.

FIG. 27 is a top perspective view of another embodiment of an integrated multi-phase inductor component assembly 550 that may likewise be mounted to the circuit board 108 (FIG. 1) on the bottom side as well as connected to the second circuit board or component 142 on the top side. The inductor component assembly 550 is similar to the component 350 described above but includes the same terminal structure on each opposing side of the magnetic core, whereas the coils 104, 106 in the component assembly 350, for example, include different terminal structure on each opposing side of the magnetic core. In the example shown, the terminal structure on the opposing sides of magnetic core structure includes planar terminal sections with terminal tabs extending therefrom as described above. As such the component assembly 500 may be through-hole mounted to the circuit board 108 and through-hole mounted to the second circuit board or component 252.

The various component assemblies described above offer a considerable variety of integrated multi-phase inductors with or without swing-type inductor functionality while using a small number of component parts that are manufacturable to provide small components at relatively low cost with superior performance advantages. Particularly in the case of high power density electrical power system applications such as the multi-phase power supply circuits and power converters for computer servers, computer workstations and telecommunication equipment, the swing-type inductors components described herein are operable with desired package size and desired efficiency that is generally beyond the capability of conventionally constructed surface mount swing-type inductor components.

The benefits and advantages of the inventive concepts disclosed are now believed to be evident in view of the exemplary embodiments disclosed.

An inductor component assembly for a circuit board has been disclosed, the inductor component assembly including a magnetic core structure having a top side and a bottom side opposing the top side, and at least one conductive coil received in a portion of the magnetic core structure. The at least one conductive coil includes a first terminal structure extending on the bottom side for connection to the circuit board, and a second terminal structure on the top side.

Optionally, the second terminal structure may be configured for through-hole mounting to another circuit board or electrical component. The second terminal structure may include a first planar terminal section and a terminal tab extending perpendicular to the first planar terminal section. The magnetic core structure may also include opposing front and rear sides extending between the top and bottom side, wherein the terminal tab extends alongside the front wall or the rear wall without extending over the front wall or rear wall.

Also optionally, the magnetic core structure may include opposing front and rear sides, and at least one of the front wall or rear wall may include at least one coil slot. The at least one coil slot may extend fully between the top and bottom sides. The at least one coil slot also may extend only partly between the front and rear sides. The magnetic core structure may include opposing left and right sides interconnecting the front and rear sides, and the opposing left and right sides may include at least one physical gap producing multiple step inductance rolloff characteristics in operation of the component.

As further options, the second terminal structure may be configured for surface mounting to another circuit board or electrical component. The magnetic core structure may also include opposing front and rear sides extending between the top and bottom side, wherein the first terminal structure and the second terminal structure each wrap around one of the front and rear sides to provide surface mount terminal structure on the front side. One of the front wall or the rear wall may include at least one coil slot. The at least one coil slot may extend fully between the top and bottom sides. The at least one coil slot may extend only partly between the front and rear sides. The magnetic core structure may include opposing left and right sides interconnecting the front and rear sides, wherein the opposing left and right sides includes at least one physical gap producing multiple step inductance rolloff characteristics in operation of the component.

The magnetic core structure optionally may be entirely defined by a single magnetic core piece. The single magnetic core piece may have a length dimension and width dimension measured parallel to a plane of the circuit board, wherein the length dimension and the width dimension are substantially equal to one another.

Alternatively, the magnetic core structure may optionally be defined by multiple magnetic core pieces. The multiple magnetic core pieces may include at least first and second identically shaped magnetic core pieces arranged in a mirror image relationship to one another, and a third magnetic core piece extending between the first and second magnetic core pieces. At least one the first and second magnetic core pieces may include a physical gap producing multiple step inductance rolloff characteristics in operation of the component.

The first terminal structure and the second terminal may respectively define a surface mount terminal structure, a through-hole terminal structure or a combination of a surface mount terminal structure and a through-hole terminal structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inductor component assembly for a circuit board, the inductor component assembly comprising:

a magnetic core structure having a top side and a bottom side opposing the top side and at least one coil slot extending from the bottom side to the top side; and at least one conductive coil comprising a planar surface mount terminal section extending on the bottom side for connection to the circuit board, a planar terminal section on the top side, a terminal tab extending perpendicular to the planar terminal section, and a planar main winding section extending perpendicularly to the planar surface mount terminal section;

wherein the at least one conductive coil is received in the magnetic core structure and the planar main winding section extends through the at least one coil slot.

2. The inductor component assembly of claim 1, wherein the terminal tab is configured for through-hole mounting to another circuit board or electrical component.

3. The inductor component assembly of claim 1, wherein the magnetic core structure further includes opposing front and rear walls extending between the top and bottom side, the opposing front and rear walls comprising a front wall and a rear wall, wherein the terminal tab extends alongside the front wall or the rear wall without extending over the front wall or rear wall.

4. The inductor component assembly of claim 1, wherein the magnetic core structure further includes opposing front and rear sides, and at least one of the front side or wall side including the at least one coil slot.

5. The inductor component assembly of claim 4, wherein the at least one coil slot extends only partly between the front and rear sides.

6. The inductor component assembly of claim 4, wherein the magnetic core structure includes opposing left and right sides interconnecting the front and rear sides, and wherein the opposing left and right sides includes at least one physical gap producing multiple step inductance rolloff characteristics in operation of the component.

7. The inductor component assembly of claim 1, wherein the planar surface mount terminal section is configured for surface mounting to another circuit board or electrical component.

8. The inductor component assembly of claim 7, the planar surface mount terminal section further comprising a terminal section extending perpendicular to the planar surface mount terminal section, wherein the magnetic core structure further includes opposing front and rear sides extending between the top and bottom side, wherein the terminal section wraps around one of the front and rear sides to provide surface mount terminal structure on the front side.

9. The inductor component assembly of claim 7, wherein the magnetic core structure further includes a front wall and a rear wall, and wherein one of the front wall or the rear wall includes the at least one coil slot.

10. The inductor component assembly of claim 9, wherein the at least one coil slot extends fully between the top and bottom sides.

11. The inductor component assembly of claim 9, wherein the at least one coil slot extends only partly between the front and rear walls.

12. The inductor component assembly of claim 7, wherein the magnetic core structure includes opposing left and right sides interconnecting front and rear sides of the magnetic core structure, and wherein the opposing left and right sides includes at least one physical gap producing multiple step inductance rolloff characteristics in operation of the component.

13. The inductor component assembly of claim 1, wherein the magnetic core structure is entirely defined by a single magnetic core piece.

14. The inductor component assembly of claim 13, wherein the single magnetic core piece has a length dimension and width dimension measured parallel to a plane of the circuit board, and wherein the length dimension and the width dimension are substantially equal to one another.

15. The inductor component assembly of claim 1, wherein the magnetic core structure is defined by multiple magnetic core pieces.

16. The inductor component assembly of claim 15, wherein the multiple magnetic core pieces includes at least first and second identically shaped magnetic core pieces arranged in a mirror image relationship to one another, and a third magnetic core piece extending between the first and second magnetic core pieces.

17. The inductor component assembly of claim 16, wherein at least one the first and second magnetic core pieces includes a physical gap producing multiple step inductance rolloff characteristics in operation of the component.

* * * * *